(12) United States Patent
Yamashita et al.

(10) Patent No.: US 9,168,682 B2
(45) Date of Patent: Oct. 27, 2015

(54) MEDIUM SUPPLY APPARTUS

(71) Applicant: MATSUI MFG. CO., LTD., Osaka-shi, Osaka (JP)

(72) Inventors: Saiji Yamashita, Hirakata (JP); Yasunari Araki, Hirakata (JP)

(73) Assignee: MATSUI MFG. CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 14/563,402

(22) Filed: Dec. 8, 2014

(65) Prior Publication Data

US 2015/0158207 A1 Jun. 11, 2015

(30) Foreign Application Priority Data

Dec. 11, 2013 (JP) ................................. 2013-256319

(51) Int. Cl.
- B29C 45/77 (2006.01)
- B29C 35/00 (2006.01)
- B29C 45/66 (2006.01)
- B29C 45/50 (2006.01)

(52) U.S. Cl.
CPC ............. B29C 35/007 (2013.01); B29C 35/002 (2013.01); *B29C 45/5008* (2013.01); *B29C 45/66* (2013.01); *B29C 45/77* (2013.01)

(58) Field of Classification Search
CPC ...... B29C 45/5008; B29C 45/77; B29C 45/66
USPC .......................................... 425/145, 149, 150
See application file for complete search history.

(56) References Cited

U.S. PATENT DOCUMENTS

| | | | | |
|---|---|---|---|---|
| 4,904,913 A * | 2/1990 | Jones et al. | ................... | 425/150 |
| 5,052,909 A * | 10/1991 | Hertzer et al. | ................ | 425/150 |
| 5,362,222 A * | 11/1994 | Faig et al. | ...................... | 425/145 |
| 5,814,353 A * | 9/1998 | Nagel | ............................ | 425/149 |
| 2003/0042640 A1* | 3/2003 | Kubota | ......................... | 425/589 |
| 2009/0246307 A1* | 10/2009 | Ochi | ............................. | 425/165 |
| 2012/0313287 A1* | 12/2012 | Nakamura | ..................... | 425/155 |
| 2013/0220459 A1* | 8/2013 | Ikarashi et al. | ............... | 425/542 |
| 2013/0313746 A1* | 11/2013 | Ikarashi et al. | ............... | 425/149 |

FOREIGN PATENT DOCUMENTS

| | | |
|---|---|---|
| JP | H06-005129 | 2/1994 |
| JP | 2002-067039 | 3/2002 |

\* cited by examiner

Primary Examiner — Tim Heitbrink
(74) Attorney, Agent, or Firm — Bret E. Field; Bozicevic, Field & Francis LLP

(57) ABSTRACT

A medium supply apparatus includes: a storage part storing, in advance, information indicating a relation between a change in the amount of medium supplied by a medium drive part and a change in a frequency obtained by conversion in an inverter in accordance with a pipe resistance in a state that an electric motor is operated in a given condition; a frequency detection part detecting the frequency of the inverter in a case that the electric motor is operated in the given condition; a medium amount calculation part, on the basis of the frequency detected by the frequency detection part and the information stored in the storage part, calculating the amount of medium to be supplied by the medium drive part; a setup part setting up a necessary amount for the medium; and a frequency control part, on the basis of the necessary amount of medium set up by the setup part, the detected frequency, and the calculated medium amount, controlling the frequency to be obtained by conversion in the inverter.

9 Claims, 8 Drawing Sheets

MEDIUM SUPPLY APPARTUS

CROSS-REFERENCE TO RELATED APPLICATIONS

This Nonprovisional application claims priority under 35 U.S.C. §119(a) on Patent Application No. 2013-256319 filed in Japan on Dec. 11, 2013, the entire contents of which are hereby incorporated by reference.

BACKGROUND

The present technology relates to a medium supply apparatus provided with an inverter converting a frequency obtained from an AC power supply and with a medium drive part equipped with an electric motor driven by the inverter.

DESCRIPTION OF THE RELATED ART

A molding machine fabricating a molded article or a molded component by using synthetic resin represented by plastics is supplementarily provided with a mold-tool temperature regulation apparatus serving as an example of a medium supply apparatus for the purpose of accurate temperature control of a mold tool. In the mold-tool temperature regulation apparatus of the conventional art, a most influencing factor to heat exchange in the mold tool is the flow rate of medium (e.g., liquid such as water). When the flow rate supplied to the mold tool is insufficient than a value designed in advance, the temperature of the mold tool varies so that stable molding is not achieved. Thus, for the purpose of recognizing the accurate flow rate, a flowmeter may be inserted into the pipe. However, flowmeters of few kinds alone are allowed to be used at high temperatures and they are expensive. Thus, in general, such flowmeters are not actually provided.

Thus, a technique is disclosed that in a mold-tool temperature regulation apparatus provided with a pump supplying temperature adjustment medium to a mold tool and with a motor (an electric motor) driving the pump, the electric current flowing from a power supply to the motor is detected and thereby the flow rate of the medium is controlled into a suitable condition by using the detected electric current and a relation between the electric current and the flow rate of the medium set forth in advance (see Japanese Utility Model Application Laid-Open No. H06-5129).

SUMMARY

However, the pipe resistance (also referred to as a pressure loss) of the pipes (and passages) including a pipe between the pump and the mold tool and a passage in the mold tool dependents on the pipe length, the pipe diameter, and the flow rate. Thus, when the mold tool is changed, the pipe resistance (the pressure loss) varies. Then, when the pipe resistance varies, a unique relation no longer holds between the electric current of the motor and the flow rate and hence the flow rate of the medium is not allowed to be calculated on the basis of the electric current value of the motor. Thus, a method is employed that for the purpose of avoiding insufficiency in the flow rate supplied to the mold tool, the medium is supplied to the mold tool always at the maximum flow rate of the mold-tool temperature regulation apparatus. This causes a problem that a large amount of medium exceeding the necessary amount is to be supplied.

The present technology has been devised in view of this situation. An object thereof is to provide a medium supply apparatus capable of supplying medium at an appropriate flow rate.

The medium supply apparatus according to the present technology is characterized by a medium supply apparatus provided with an inverter converting a frequency obtained from an AC power supply and with a medium drive part equipped with an electric motor driven by the inverter, so that a medium is supplied through a pipe by the medium drive part, the medium supply apparatus including: a storage part storing, in advance, information indicating a relation between a change in the amount of medium supplied by the medium drive part and a change in a frequency obtained by conversion in the inverter in accordance with a pipe resistance in a state that the electric motor is operated in a given condition; a frequency detection part detecting the frequency of the inverter in a case that the electric motor is operated in the given condition; a medium amount calculation part, on the basis of the frequency detected by the frequency detection part and the information stored in the storage part, calculating the amount of medium to be supplied by the medium drive part; a setup part setting up a necessary amount for the medium; and a frequency control part, on the basis of the necessary amount of medium set up by the setup part, the frequency detected by the frequency detection part, and the amount of medium calculated by the medium amount calculation part, controlling the frequency to be obtained by conversion in the inverter.

In the present technology, the storage part stores, in advance, information indicating the relation between a change in the amount of medium (e.g., the flow rate of the medium) supplied by the medium drive part and for a change in the frequency obtained by conversion in the inverter in correspondence to the pipe resistance in a case that the electric motor is operated in a given condition. For example, when the electric motor is driven (operated) in a constant torque region, the given condition indicates that the torque of the electric motor has an arbitrary given value. Further, when the electric motor is driven (operated) in a constant output region, the given condition indicates that the output (the electric power) of the electric motor has an arbitrary given value. The given value may be the maximum (e.g., the maximum continuous rating or the momentary maximum rating) or a value (e.g., 90%, 80%, or 70%) smaller than the maximum. In a case that the electric motor is operated (driven) in a given (fixed) condition, when the pipe resistance (i.e., the pressure loss) is high, the medium is difficult to flow. Thus, the revolution rate is restricted within the rating and hence the flow rate is not allowed to be increased very high so that the flow rate and the inverter frequency become relatively low. In contrast, when the pipe resistance (i.e., the pressure loss) is low, the medium becomes easy to flow. Thus, the revolution rate is allowed to be increased within the rating so that the flow rate is allowed to be increased. Accordingly, the flow rate and the inverter frequency become relatively high.

In a case that the electric motor is operated in a given condition, the frequency detection part detects the frequency obtained by conversion in the inverter. The given condition is the same as the operating condition of the electric motor at the occasion that the information indicating the relation between the frequency and the medium amount stored in the storage part was acquired. Further, when the frequency is to be detected, for example, in a situation that the mold tool serving as a load to the medium supply apparatus is set, the pipe resistance (the pressure loss) of the pipes (and passages) including the pipe between the medium drive part (e.g., a pump) and the mold tool and the passage in the mold tool is maintained at a particular value.

On the basis of the frequency detected by the frequency detection part and the information stored in the storage part, the medium amount calculation part calculates the amount of medium to be supplied by the medium drive part. That is, in the information indicating the relation between the frequency and the medium amount stored in the storage part, a flow rate corresponding to the detected frequency is identified and then the identified flow rate is calculated as the amount of medium. Here, "to calculate" may also be referred to as "to identify". The calculated medium amount indicates the flow rate of the medium in a situation that the electric motor is driven (operated) at the maximum (the maximum rating) or at a given value smaller than the maximum in a condition that the pipe resistance (the pressure loss) of the pipes (and passages) including the pipe between the medium drive part (e.g., a pump) and the mold tool and the passage in the mold tool is maintained at a particular value. In particular, in a case that the electric motor is driven at the maximum, the order of magnitude of the maximum flow rate is allowed to be recognized for a mold tool whose pressure loss is unknown.

On the basis of the necessary amount of medium set up by the setup part, the detected frequency, and the calculated medium amount, the frequency control part controls the frequency to be obtained by conversion in the inverter. For example, when a linear relation holds between the frequency and the medium amount, by using the detected frequency Fm, the calculated medium amount Qm, and the necessary medium amount Qr, the frequency control part calculates, in accordance with a formula $Fr=(Fm/Qm) \times Qr$, the frequency (also referred to as an operating frequency) Fr to be generated by conversion in the inverter and then performs control such that the calculated frequency is achieved.

By virtue of this, when a necessary flow rate Qr has been set up, in accordance with the pipe resistance of the pipes (and passages) including the pipe between the medium drive part (e.g., a pump) and the mold tool and the passage in the mold tool, the electric motor is allowed to be operated in a condition suitable for ensuring the necessary flow rate Qr. Thus, the medium at the necessary flow rate is allowed to be supplied without uselessness. Further, since a large amount of unnecessary medium is not to be supplied, power saving is achieved.

The medium supply apparatus according to the present technology is characterized in that the given condition is that a torque of the electric motor in a constant torque region has an arbitrary given value.

In the present technology, the given condition is that the torque of the electric motor in a constant torque region has an arbitrary given value. Thus, in constant torque operation where the electric motor is driven with an inverter frequency at or below a basic frequency, the necessary amount of medium is allowed to be supplied.

The medium supply apparatus according to the present technology is characterized in that the given condition is that an output of the electric motor in a constant output region has an arbitrary given value.

In the present technology, the given condition is that the output of the electric motor in a constant output region has an arbitrary given value. Thus, in constant output operation where the electric motor is driven with an inverter frequency at or above a basic frequency, the necessary amount of medium is allowed to be supplied.

The medium supply apparatus according to the present technology is characterized in that the given value is a maximum of the electric motor.

In the present technology, the given value is a maximum. In a case that a necessary medium amount Qr is given, when the frequency (the operating frequency) Fr to be generated by conversion in the inverter is to be controlled, a straight line or a curve is used that joins a point where the medium amount and the frequency are zero and a point where the medium amount is Qm and the frequency is Fm. Whether the straight line or the curve is to be employed is allowed to be determined by investigating in advance the characteristics of the pump. In this case, when the given value is a maximum, an operating frequency Fr corresponding to an arbitrary value at or below the maximum is allowed to be acquired.

The medium supply apparatus according to the present technology is characterized by including: a detection part detecting the torque or a physical quantity relevant to the torque of the electric motor; and a reporting part, when the torque or the physical quantity relevant to the torque detected by the detection part is greater than the maximum, reporting the situation.

In the present technology, when the torque or the physical quantity relevant to the torque detected by the detection part is greater than the maximum, the reporting part reports the situation. By virtue of this, a situation is avoided that the electric motor is driven in a condition of exceeding the maximum.

The medium supply apparatus according to the present technology is characterized by including: an identification part, from the information stored in the storage part, identifying a frequency corresponding to a particular pipe resistance; and a determination part, when a difference between the frequency detected by the frequency detection part and the frequency identified by the identification part is greater than a given threshold, determining as abnormal.

In the present technology, from the information stored in the storage part, the identification part identifies a frequency corresponding to a particular pipe resistance. For example, in a case that a mold tool is connected through a passage to the medium supply apparatus, the particular pipe resistance indicates a pipe resistance including that of the mold tool. That is, an inverter frequency (also referred to as an initial setting frequency Fd) corresponding to the pipe resistance of a case that a necessary mold tool is used is identified in advance. Then, in a situation that the electric motor is actually operated by using the mold tool, when the difference $\Delta F$ between the frequency Fm detected by the frequency detection part and the frequency Fd stored in the storage part is greater than a given threshold TH, the determination part determines as abnormal. When the difference $\Delta F$ is greater than the threshold TH, the occurrence of an abnormality such as clogging in the pipe, leakage from the pipe, a failure in the opening and closing of a valve inserted into the pipe, and an abnormality in the medium drive part is allowed to be concluded so that rapid fixing is achievable.

The medium supply apparatus according to the present technology is characterized by including a notification part, on the basis of the frequency detected by the frequency detection part and the information stored in the storage part, notifying the amount of medium flowing through the pipe.

In the present technology, on the basis of the frequency Fm detected by the frequency detection part and the information stored in the storage part, the notification part notifies the amount of medium flowing through the pipe. That is, in the information indicating the relation between the frequency and the medium amount stored in the storage part, a flow rate corresponding to the detected frequency Fm is identified and then the identified flow rate is notified as the amount of medium flowing through the pipe. By virtue of this, even when the pressure loss of the mold tool used actually is unknown, the flow rate of the medium in a case that the electric motor is operated in a given condition is allowed to be recognized.

The medium supply apparatus according to the present technology is characterized by including: a detection part detecting the torque or a physical quantity relevant to the torque of the electric motor; an identification part, from the information stored in the storage part, identifying a torque or a physical quantity relevant to the torque corresponding to a particular pipe resistance; and a determination part, when a difference between the torque or the physical quantity relevant to the torque detected by the detection part and the torque or the physical quantity relevant to the torque identified by the identification part is greater than a given threshold, determining as abnormal.

In the present technology, from the information stored in the storage part, the identification part identifies a torque or a physical quantity relevant to the torque corresponding to the particular pipe resistance. For example, in a case that a mold tool is connected through a passage to the medium supply apparatus, the particular pipe resistance indicates a pipe resistance including that of the mold tool. That is, a torque or a physical quantity relevant to the torque corresponding to the pipe resistance of a case that a necessary mold tool is used is identified in advance. Then, in a situation that the electric motor is actually operated by using the mold tool, when the difference between the torque or the physical quantity relevant to the torque detected by the detection part and the torque or the physical quantity relevant to the torque stored in the storage part is greater than a given threshold, the determination part determines as abnormal. When the difference is greater than the threshold, the occurrence of an abnormality such as clogging in the pipe, leakage from the pipe, a failure in the opening and closing of a valve inserted into the pipe, and an abnormality in the medium drive part is allowed to be concluded so that rapid fixing is achievable.

According to the present technology, medium at a necessary flow rate is allowed to be supplied.

The above and further objects and features will more fully be apparent from the following detailed description with accompanying drawings.

DETAILED DESCRIPTION

Figure 1:
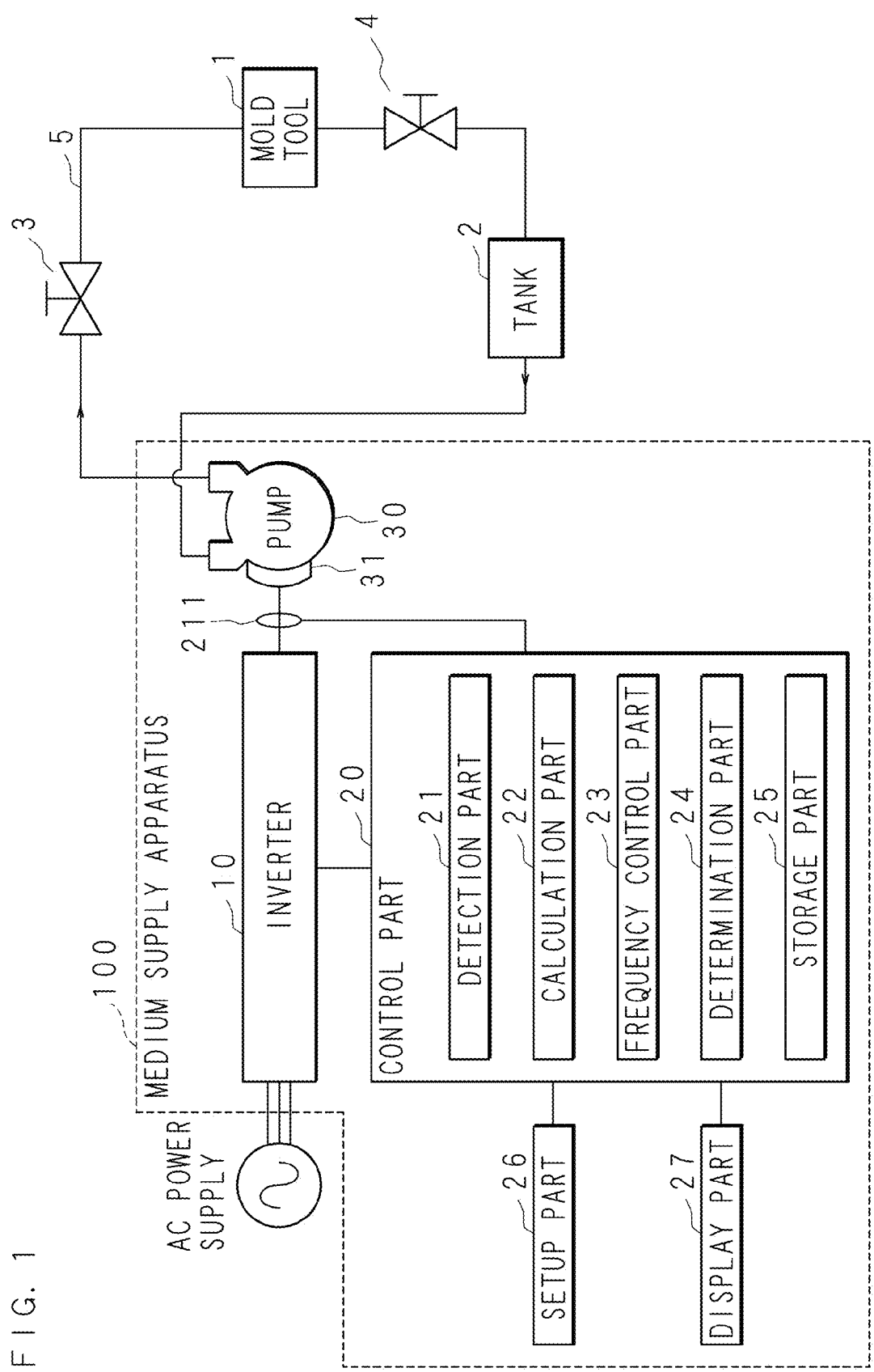
FIG. 1 is an explanation diagram illustrating an example of configuration of a medium supply apparatus according to the present embodiment.

The present technology is described below with reference to the drawings illustrating an embodiment. FIG. 1 is an explanation diagram illustrating an example of configuration of a medium supply apparatus 100 according to the present embodiment. For example, the medium supply apparatus 100 is a mold-tool temperature regulation apparatus. However, employable configurations are not limited to this. As illustrated in FIG. 1, the medium supply apparatus 100 includes an inverter 10, a control part 20, a pump 30, a setup part 26, and a display part 27. Further, the control part 20 includes a detection part 21, a calculation part 22, a frequency control part 23, a determination part 24, and a storage part 25. Furthermore, the pump 30 includes a motor 31 constructed from an electric motor.

A pipe 5 used for sending liquid from the pump 30 to a mold tool 1 and a pipe 5 used for returning the liquid from the mold tool 1 to the pump 30 are connected between the pump 30 and the mold tool 1 into which the liquid serving as a medium is to be supplied. A medium sending valve 3 is inserted into the pipe 5 used for sending the liquid from the pump 30 to the mold tool 1. Further, a medium returning valve 4 and a tank 2 are inserted into the pipe 5 used for returning the liquid from the mold tool 1 to the pump 30. Here, the tank 2 is connected to a water supply pipe and a drain pipe (both not illustrated).

The tank 2 includes a heater and a heat exchanger (both not illustrated) and is allowed to set into a given temperature the temperature of the liquid returned from the mold tool 1. The present embodiment is described for an example that a mold tool is employed as an apparatus (a load) to which the liquid is supplied. However, the employed apparatus to which the liquid is supplied is not limited to a mold tool, and may be a heat exchanger having a fluctuating liquid flow rate as well as other apparatuses.

In the present embodiment, the mold tool 1 may be of diverse kind from a relatively small one to a relatively large one. For example, a small mold tool is employed for a molded article having relatively small dimensions but a complicated shape. In the case of a small mold tool for forming a complicated molded article, the amount of resin to be injected is small and hence a relatively low flow rate is sufficient. However, the passage provided in the mold tool becomes complicated and hence the pipe resistance becomes high. Thus, high-pressure liquid is to be supplied. On the other hand, in the case of a molded article having large dimensions but a simple shape, a large mold tool is employed and hence the amount of resin to be injected becomes large. Thus, for the purpose of control of the temperature of the mold tool into an appropriate temperature, the liquid is to be supplied at a relatively high flow rate. Further, the employed liquid may be water, oil, or the like. Then, the following description is given for a case that water is employed as an example of the liquid.

Here, the pipe resistance (also referred to as a pressure loss) of the pipes (and passages) including the pipe 5 between the pump 30 and the mold tool 1 and the passage in the mold tool 1 dependents on the pipe length, the pipe diameter, and the flow rate. Thus, when the pipe 5 and the mold tool 1 are changed, the pipe resistance also varies.

The inverter 10 converts the frequency (the basic frequency) such as 50 Hz and 60 Hz supplied from an AC power supply and then outputs to the motor 31 of the pump 30 an alternating voltage of the frequency obtained by conversion.

In the pump 30, in the inside of a casing (a container), an impeller is revolved at a high speed in association with revolution of the motor 31 so that water is supplied through the pipe 5 to the mold tool 1 by means of a centrifugal force acting on the water (the liquid).

The detection part 21 detects the torque or a physical quantity relevant to the torque of the motor 31. For example, the physical quantity relevant to the torque is the torque current, the output (the output power), or the like of the motor 31. Here, the torque mentioned here includes also a torque ratio (a non-dimensionalized quantity) obtained by dividing the actual torque by the rated torque (a fixed value specific to the motor 31). In the present embodiment, the physical quantity relevant to the torque of the motor 31 may include the torque current, the load current, the output power, and the like of the motor 31 that are allowed to be converted into the torque of the motor 31. That is, the "torque of the motor 31" mentioned here may, in addition to the torque itself of the motor 31, include the torque current, the load current, and the output power of the motor 31 serving as physical quantities relevant to the torque.

Here, the detection part 21 may have a configuration that a sensor (not illustrated) in the inside of the inverter 10 detects the physical quantity. Alternatively, a sensor 211 may be provided between the inverter 10 and the motor 31 and then the sensor 211 provided in the outside of the inverter 10 may detect the physical quantity.

The relation between the frequency obtained by conversion in the inverter 10 and the revolution rate (also referred to as a "revolution speed") of the revolving shaft of the motor 31 is expressed as $Vf=120\times F/S$. Here, Vf denotes the revolution rate of the revolving shaft of the motor 31, S denotes the number of poles of the motor 31, and F denotes the frequency of the inverter 10. For example, in a case that the motor 31 has four poles and the frequency F of the inverter 10 is 50 Hz, the revolution rate Vf of the revolving shaft of the motor 31 becomes 1500 rpm. In a case that the frequency F of the inverter 10 is 60 Hz, the revolution rate Vf of the revolving shaft of the motor 31 becomes 1800 rpm.

Figure 2:
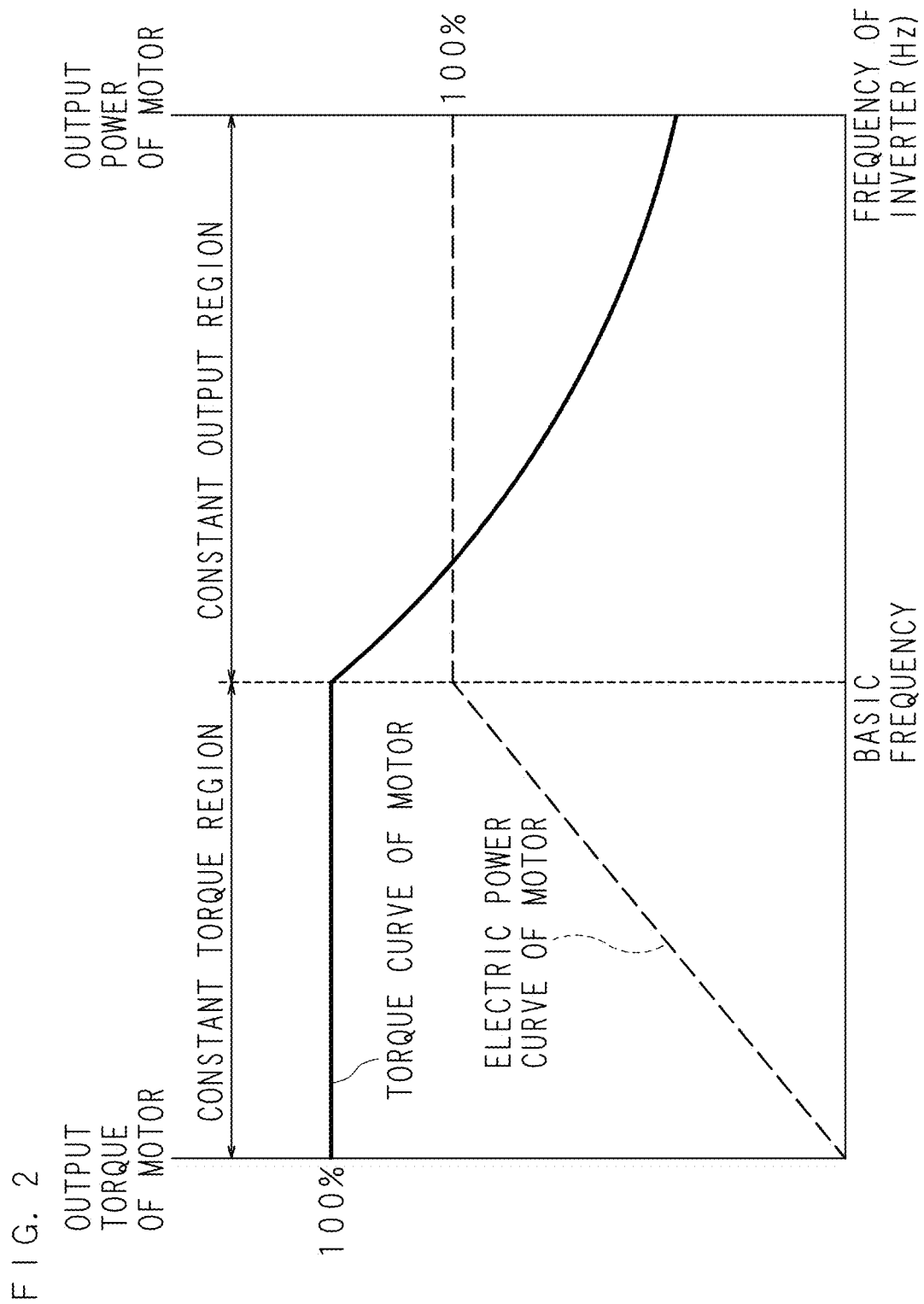
FIG. 2 is an explanation diagram illustrating an example of an output characteristic of an inverter-controlled motor according to the present embodiment.

FIG. 2 is an explanation diagram illustrating an example of the output characteristic of the inverter-controlled motor 31 according to the present embodiment. In FIG. 2, the horizontal axis indicates the frequency of the inverter 10 and the vertical axis indicates the torque (the output torque) and the output power of the motor 31. As illustrated in FIG. 2, the output characteristic of the motor 31 has a different behavior on each side of a border where the frequency of the inverter 10 becomes the basic frequency (e.g., 50 Hz or 60 Hz). At or below the basic frequency, a constant torque characteristic is obtained (a constant torque region). At or above the basic frequency, a constant output characteristic is obtained (a constant output region).

In FIG. 2, as illustrated by the torque curve (the torque characteristic) of the motor 31 indicated by a solid line, the torque of the motor 31 is fixed in the constant torque region. Then, in the constant output region, the torque gradually decreases with increasing frequency of the inverter 10. On the torque curve of the motor 31 in the constant output region, the output power of the motor becomes constant.

Further, in FIG. 2, as illustrated by the electric power curve (the output power characteristic) of the motor 31 indicated by a dashed line, in the constant torque region, the output power of the motor 31 gradually increases with increasing frequency of the inverter 10. Then, the output power is fixed in the constant output region.

Figure 3:
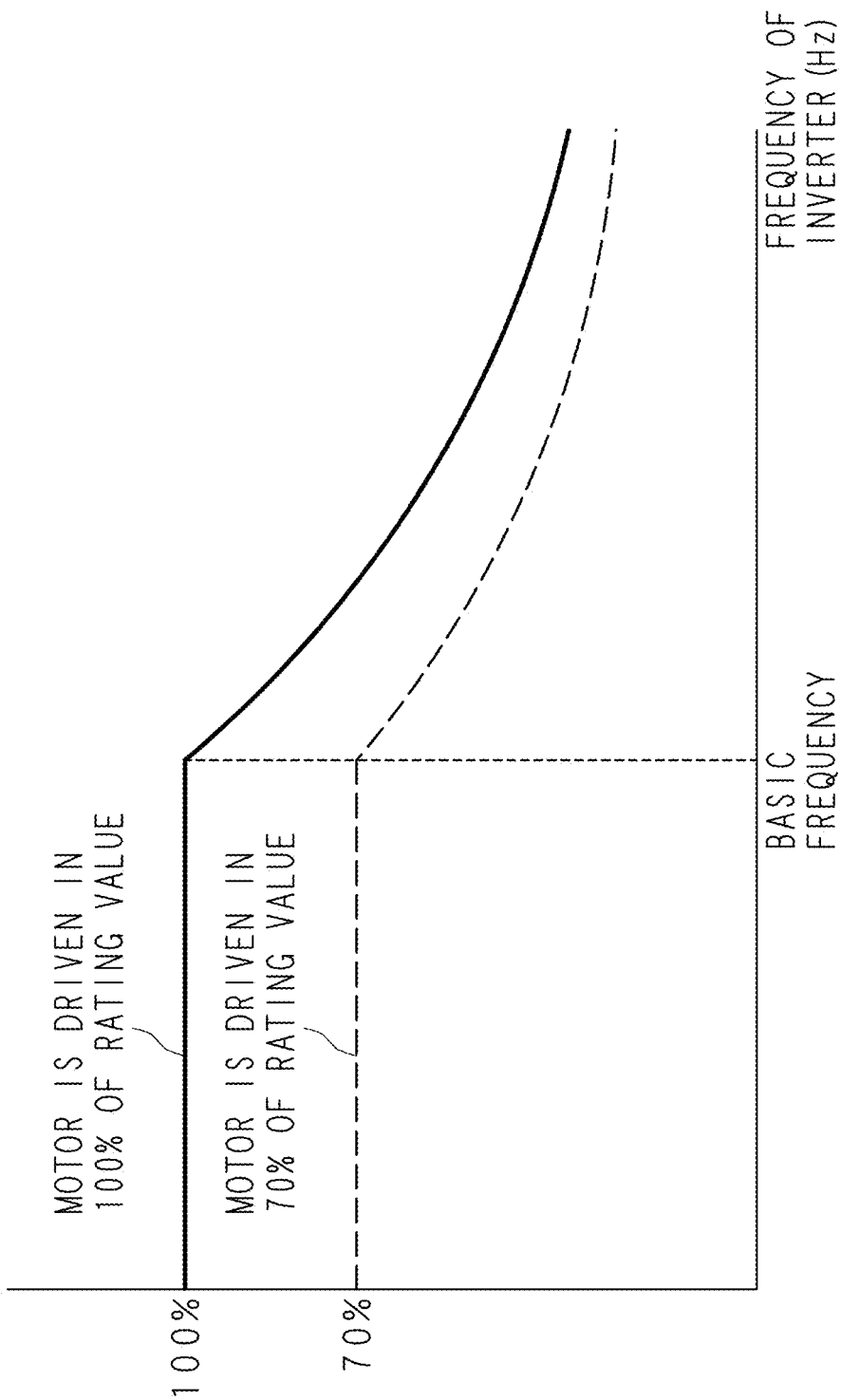
FIG. 3 is an explanation diagram illustrating an example of an operating condition of an inverter-controlled motor according to the present embodiment.

FIG. 3 is an explanation diagram illustrating an example of the operating condition of the inverter-controlled motor 31 according to the present embodiment. In the present embodiment, the motor 31 is driven (operated) in a given condition by the inverter 10. For example, when the motor 31 is driven (operated) in the constant torque region, the given condition indicates that the torque of the motor 31 has an arbitrary given value. FIG. 3 illustrates examples that the output torque serving as the given value is the rating value (100%) and 70% of the rating value. However, employable given values for the torque are not limited to these. That is, the given value may be the maximum (e.g., the maximum continuous rating or the momentary maximum rating serving as a maximum rating value) or a value smaller than the maximum (e.g., 90%, 80%, or 70% of the maximum). Further, the given value for the torque includes values on the straight line or the curve serving as the torque curve.

Further, when the motor 31 is driven (operated) in the constant output region, the given condition indicates that the output of the motor 31 has an arbitrary given value. In the example of FIG. 3, in the constant torque region, the output torque is fixed at the rating value (100%) or at 70% of the rating value. Then, in the constant output region, the torque gradually decreases with increasing frequency of the inverter 10. Further, in the constant output region, the output (the output power) of the motor 31 becomes fixed at the rating value (100%) or at 70% of the rating value. Here, employable given values for the output power are not limited to these. That is, the given value for the output power may be the maximum (e.g., the maximum continuous rating or the momentary maximum rating serving as a maximum rating value) or a value smaller than the maximum (e.g., 90%, 80%, or 70% of the maximum). Further, the given value for the output power includes values on the straight line or the curve serving as the electric power curve (the output curve).

The storage part 25 stores, in advance, information indicating the relation between a change in the amount of medium (e.g., the flow rate of the medium) supplied by the pump 30 serving as the medium drive part and for a change in the frequency obtained by conversion in the inverter 10 in correspondence to the pipe resistance in a case that the motor 31 is operated in the given condition as illustrated in FIG. 3.

Figure 4:
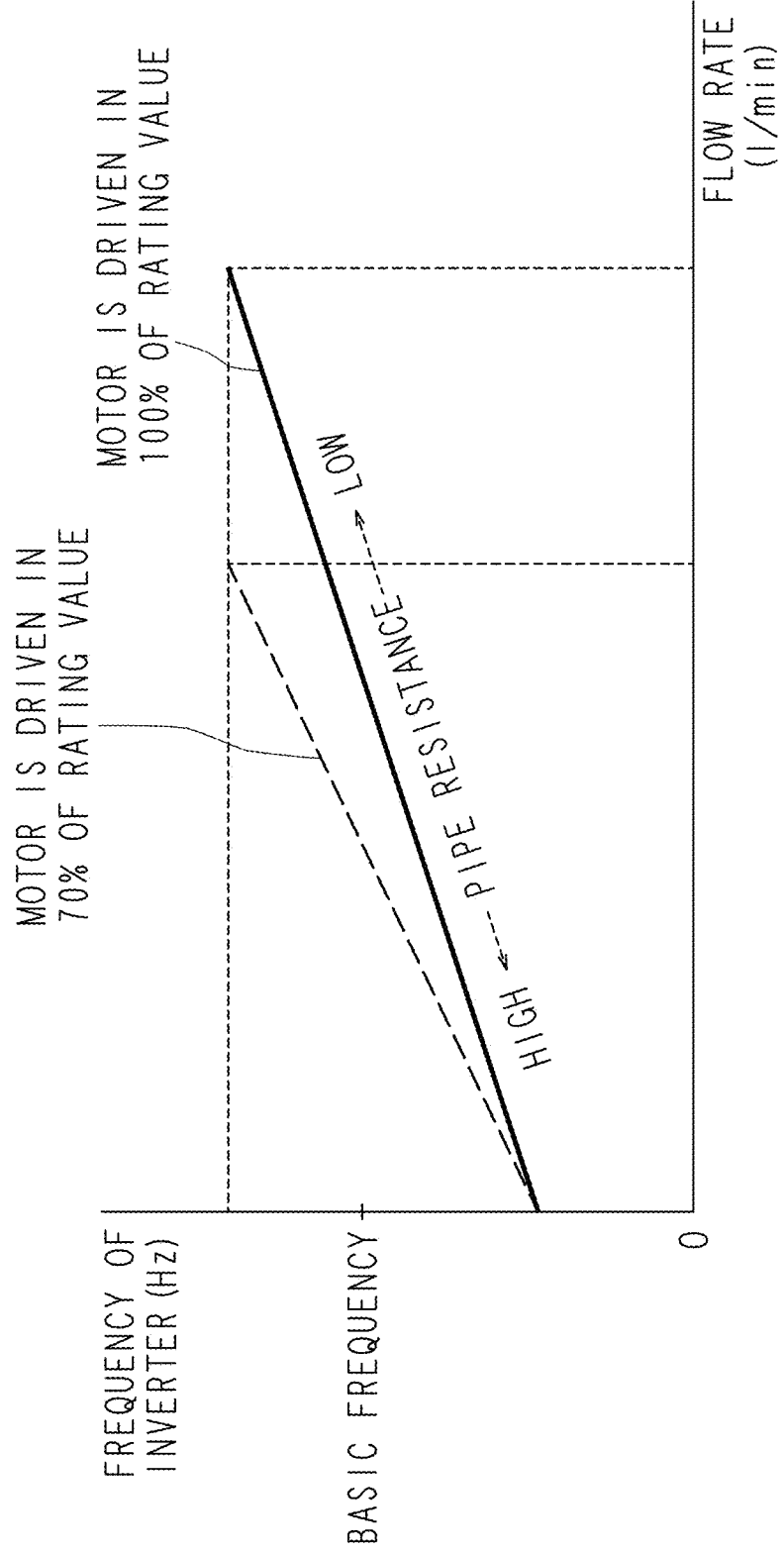
FIG. 4 is an explanation diagram illustrating an example of a flow-rate-to-frequency characteristic of a pump.

FIG. 4 is an explanation diagram illustrating an example of the flow-rate-to-frequency characteristic of the pump 30. In FIG. 4, the horizontal axis indicates the flow rate of the medium and the vertical axis indicates the frequency obtained by conversion in the inverter 10. The chart illustrated in FIG. 4 illustrates the relation between the frequency obtained by conversion in the inverter 10 and the flow rate of the medium of a case that the frequency to be obtained by conversion in the inverter 10 is set to be an arbitrary frequency, then the pump 30 and the mold tool are connected to each other through a plurality of pipes arranged in parallel, then the degree of opening and closing of the switching valve inserted in the middle of each pipe is adjusted such that the motor 31 is operated in a given condition, and thereby the pipe resistance (the pressure loss) is changed. Similarly to FIG. 3, FIG. 4 illustrates examples that the given condition of operation of the motor 31 is the maximum operation (indicated by a solid straight line in FIG. 4) and operation at 70% of the maximum (indicated by a dashed straight line in FIG. 4).

In a case that the motor 31 is operated (driven) in a given (fixed) condition, when the pipe resistance (i.e., the pressure loss) is high, the medium is difficult to flow and hence the inverter frequency is to be set relatively high in comparison with the case of a mold tool in which the medium flows easily. In contrast, when the pipe resistance (i.e., the pressure loss) is low, the medium flows easily and hence the inverter frequency is allowed to be set relatively low.

The information stored in the storage part 25 and indicating the relation between the change in the frequency obtained by conversion in the inverter 10 and the change in the amount of medium supplied by the pump 30 is as illustrated in FIG. 4. The storage part 25 may store the information like that illustrated in FIG. 4, in the configuration of an LUT (a look-up table) or the like. Alternatively, the medium supply apparatus 100 may incorporate an arithmetic circuit acquiring by arithmetic operation the relation like that illustrated in FIG. 4, so that the storage may be implemented.

The information illustrated in FIG. 4 varies depending on the model, the rating, or the like change of the pump 30. Thus, the storage part 25 may store the flow-rate-to-frequency characteristic of the pump 30 for each model or rating of the pump 30.

As an example of the flow-rate-to-frequency characteristic of the pump 30 illustrated in FIG. 4, for example, in a case that the motor 31 is in the maximum operation, when the flow rate of the medium is zero (the switching valve is full closes), the frequency obtained by conversion in the inverter 10 is 47 (Hz). Further, when the flow rate is 60 (l/min) (the switching valve is full open), the frequency obtained by conversion in the inverter 10 is 65 (Hz), and so on. Here, these numerical values are exemplary and not restrictive.

The detection part 21 has the function of a frequency detection part and detects the frequency obtained by conversion in the inverter 10 when the motor 31 is operated in a given condition. The given condition is the same as the operating condition of the motor 31 at the occasion that the information indicating the relation between the frequency and the medium amount stored in the storage part 25 was acquired. Further, when the frequency is to be detected by the detection part 21, for example, the pipe resistance (the pressure loss) of the pipes (and passages) including the pipe between the pump 30 and the mold tool 1 and the passage in the mold tool in a situation that the mold tool 1 serving as a load to the medium supply apparatus 100 is set is maintained at a particular value as long as the motor 31 is operated in the given condition.

The calculation part 22 has the function of a medium amount calculation part and, on the basis of the frequency detected by the detection part 21 and the information stored in the storage part 25, calculates the amount of medium supplied by the pump 30.

That is, in the information indicating the relation between the frequency and the medium amount stored in the storage part 25, a flow rate corresponding to the detected frequency is identified and then the identified flow rate is calculated as the amount of medium. Here, "to calculate" may also be referred to as "to identify". The calculated medium amount indicates the flow rate of the medium in a situation that the motor 31 is driven (operated) at the maximum (the maximum rating) or at a given value smaller than the maximum in a condition that the pipe resistance (the pressure loss) of the pipes (and passages) including the pipe between the pump 30 and the mold tool 1 and the passage in the mold tool is maintained at a particular value. In particular, in a case that the motor 31 is driven at the maximum, the order of magnitude of the maximum flow rate is allowed to be recognized for a mold tool whose pressure loss is unknown.

The setup part 26 includes an operation panel or the like and is allowed to receive operation that a user sets into a necessary flow rate the flow rate of the medium supplied to the mold tool 1. The setup part 26 outputs the set-up flow rate to the frequency control part 23.

On the basis of the necessary flow rate (the amount of medium) set up by the setup part 26, the frequency detected by the detection part 21, and the amount of medium calculated by the calculation part 22, the frequency control part 23 controls the frequency to be obtained by conversion in the inverter 10. For example, by using the detected frequency Fm, the calculated medium amount Qm, and the necessary medium amount Qr, the frequency control part 23 calculates, in accordance with a formula $Fr=(Fm/Qm)\times Qr$, the frequency (also referred to as an operating frequency) Fr to be generated by conversion in the inverter 10 and then performs control such that the calculated frequency is achieved.

Figure 5:
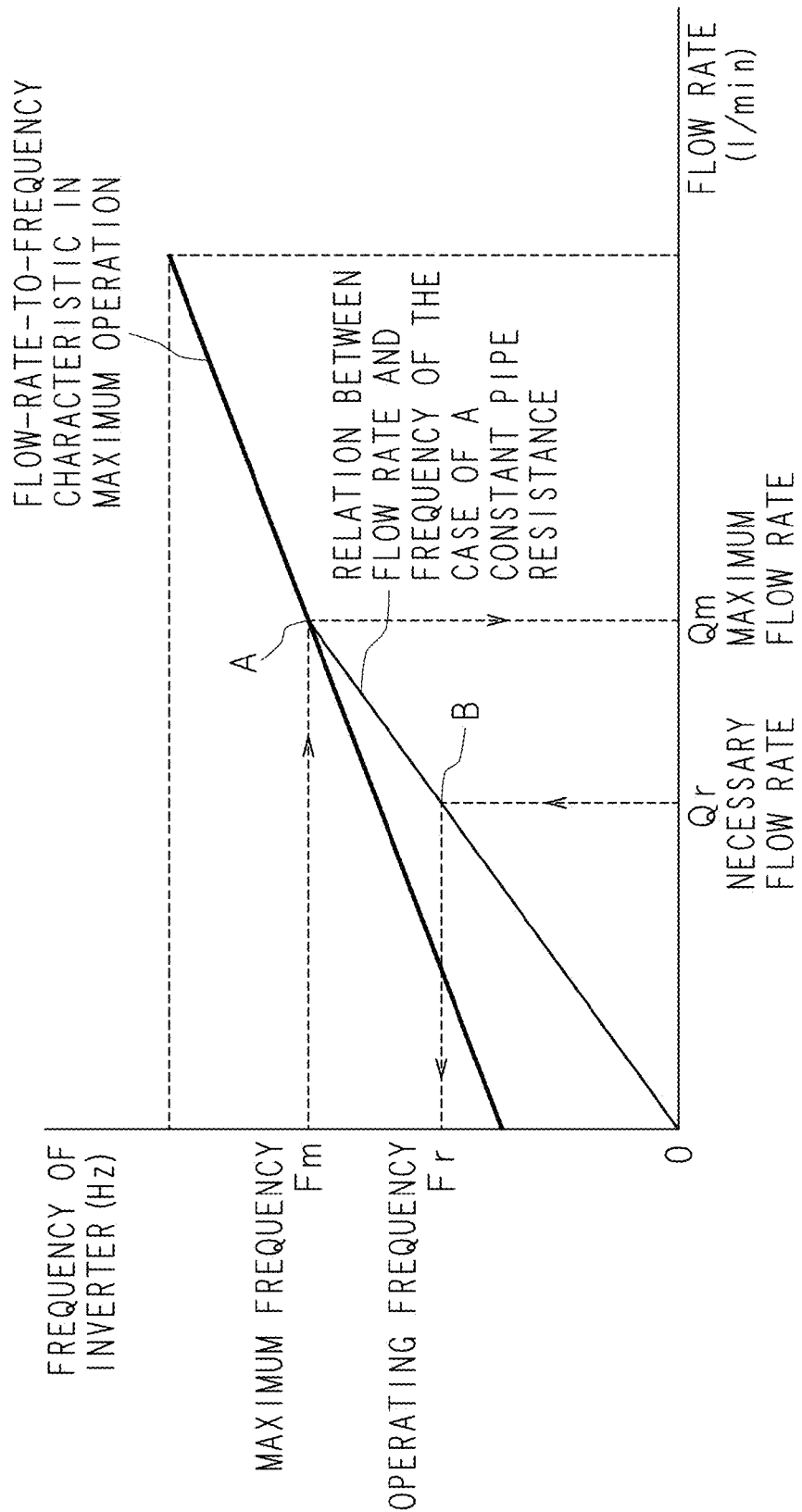
FIG. 5 is an explanation diagram illustrating an example of a method of controlling the frequency to be obtained by conversion in an inverter in a medium supply apparatus according to the present embodiment.

FIG. 5 is an explanation diagram illustrating an example of a method of controlling the frequency obtained by conversion in the inverter 10 in the medium supply apparatus 100 according to the present embodiment. The following description is given for a case that the given operating condition (operating state) of the motor 31 is of the maximum operation. In FIG. 5, the horizontal axis indicates the flow rate of the medium and the vertical axis indicates the frequency obtained by conversion in the inverter 10. In FIG. 5, the straight line indicated as "flow-rate-to-frequency characteristic in maximum operation" is the same as the straight line of "maximum operation" illustrated in FIG. 4. That is, the given operating condition of the motor 31 is the maximum operation.

Then, a case is investigated that the medium supply apparatus 100 according to the present embodiment is provided and then water serving as the medium is supplied to a mold tool 1 whose pressure loss is unknown. When the motor 31 is driven in the maximum operation state, the detection part 21 detects the frequency obtained by conversion in the inverter 10 (the maximum frequency Fm in FIG. 5).

Then, on the basis of the maximum frequency Fm detected by the detection part 21 and the information stored in the storage part 25, the calculation part 22 calculates (identifies) the amount of medium supplied by the pump 30 (the maximum flow rate Qm in FIG. 5). That is, point A corresponding to the detected maximum frequency Fm is identified on the straight line indicating the flow-rate-to-frequency characteristic in the maximum operation. Then, the flow rate corresponding to point A is calculated (identified) as the maximum flow rate Qm.

In a case that a linear relation holds between the frequency and the flow rate, when point A defined by the maximum frequency Fm and the maximum flow rate Qm is identified, a line segment joining point A and the origin is identified. The pipe resistance varies on the straight line indicated as "flow-rate-to-frequency characteristic in maximum operation". The line segment joining the origin and point A indicates the relation between the flow rate and the frequency of a case that the pipe resistance is identical to that at point A. When F denotes the frequency on the flow-rate-to-frequency characteristic of the case of a constant pipe resistance and Q denotes the flow rate, a formula $F=(Fm/Qm)\times Q$ is obtained. In a case that a linear relation does not hold between the frequency and the flow rate, the frequency is allowed to be derived from the flow rate by using a regression curve.

Then, when Qr denotes the necessary flow rate supplied to the mold tool 1, the operating frequency Fr obtained by conversion in the inverter 10 is acquired in accordance with a formula $Fr=(Fm/Qm)\times Qr$. That is, the frequency control part 23 performs control such that the frequency obtained by conversion in the inverter 10 becomes Fr, so that the medium at the flow rate Qr is allowed to be supplied to the mold tool 1.

By virtue of this, when a necessary flow rate Qr has been set up, in accordance with the pipe resistance of the pipes (and passages) including the pipe between the pump 30 and the mold tool 1 and the passage in the mold tool, the motor 31 is allowed to be operated in a condition suitable for ensuring the necessary flow rate Qr. Thus, the medium at the necessary flow rate is allowed to be supplied without uselessness. Further, since a large amount of unnecessary medium is not to be supplied, power saving is achieved.

Here, FIG. 5 has been described for an example that the given operating condition of the motor 31 is the maximum operation. However, the given operating condition is not limited to the maximum operation. That is, even when the operation is performed at a value smaller than the maximum (e.g., 70%, 80%, or 90% of the maximum), the medium at the necessary flow rate is similarly allowed to be supplied to the mold tool 1.

However, in a case that the frequency (the operating frequency) Fr to be generated by conversion in the inverter 10 in accordance with a necessary medium amount Qr is to be acquired, the straight line or the curve is used that joins a point where the medium amount and the frequency are zero and a point where the medium amount is Qm and the frequency is Fm. Thus, when the given value is the maximum rating value, an operating frequency Fr corresponding to an arbitrary value at or below the maximum rating is allowed to be acquired.

Further, as described above, in the given condition, the torque in the constant torque region of the motor 31 has an arbitrary given value. Thus, in constant torque operation where the motor 31 is driven with an inverter 10 frequency at or below the basic frequency, the necessary amount of medium is allowed to be supplied.

Further, in the given condition, the output in the constant output region of the motor 31 has an arbitrary given value. Thus, in constant output operation where the motor 31 is driven with an inverter 10 frequency at or above the basic frequency, the necessary amount of medium is allowed to be supplied.

Figure 6:
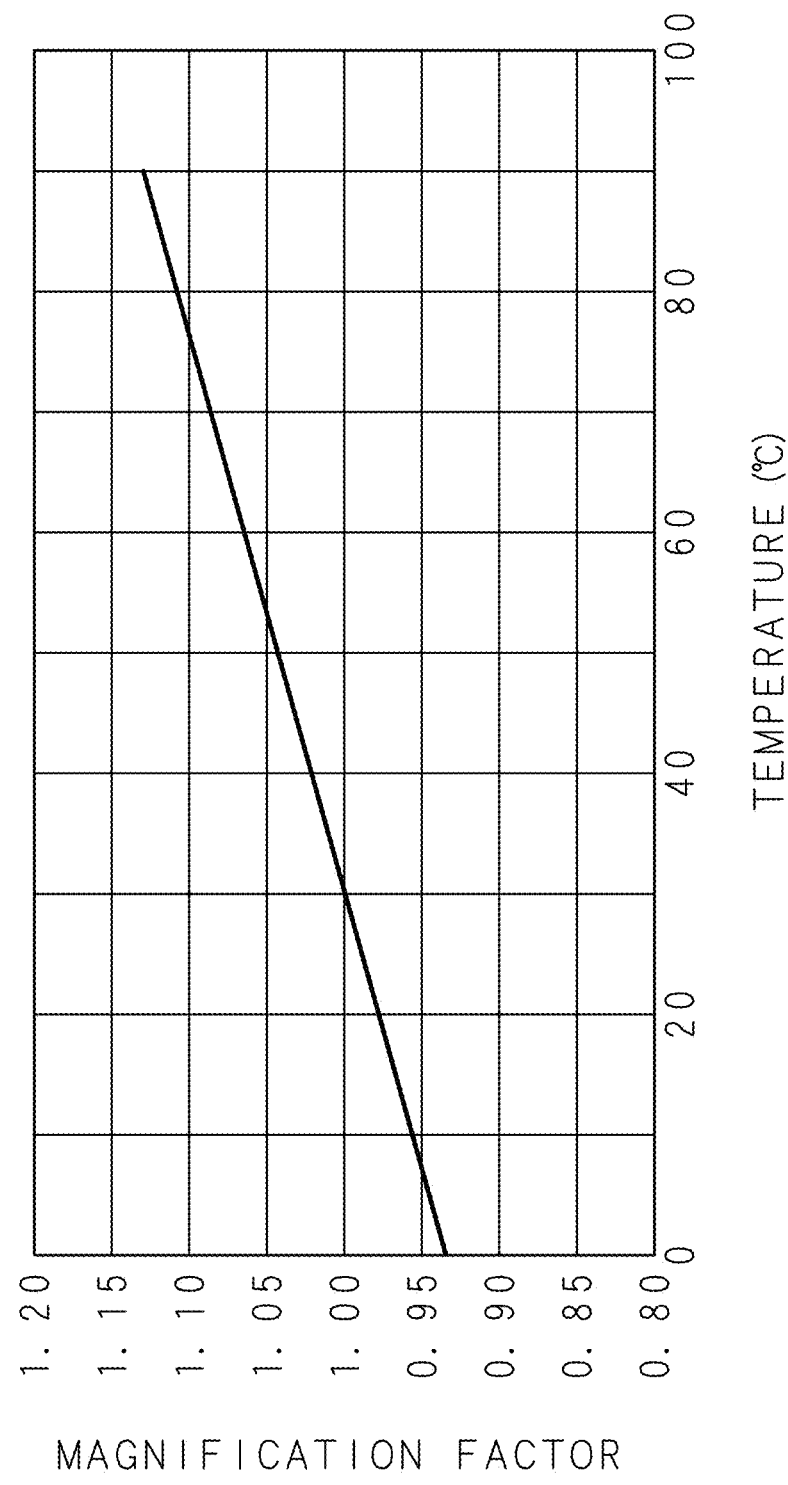
FIG. 6 is an explanation diagram illustrating an example of a magnification factor used when a flow rate is to be corrected in accordance with a temperature change in a medium.

FIG. 6 is an explanation diagram illustrating an example of a magnification factor used when the flow rate is to be corrected in accordance with a temperature change in the medium. In a case that a change in the flow rate depending on the temperature of the medium is not negligible, the flow rate is allowed to be corrected by using a magnification factor illustrated in FIG. 6. In the example of FIG. 6, the magnification factor for the flow rate at a temperature of 30° C. is defined as 1. Then, when the temperature varies from 30° C., a magnification factor corresponding to the temperature posterior to the variation is multiplied to the flow rate at 30° C. so that the flow rate corresponding to the temperature posterior to the variation is obtained. For example, in a case that the flow rate at 30° C. is 55 (l/min), the magnification factor at a temperature of 80° C. is approximately 1.1. Thus, the flow rate at the temperature of 80° C. becomes 60.5 (l/min) (=55× 1.1). For other temperature values, the flow rate is allowed to be calculated similarly. Here, the data like that illustrated in FIG. 6 may be stored in the storage part 25 or, alternatively, obtained by arithmetic operation. By virtue of this, the medium at an appropriate flow rate is allowed to be supplied regardless of the temperature of the medium.

Figure 7:
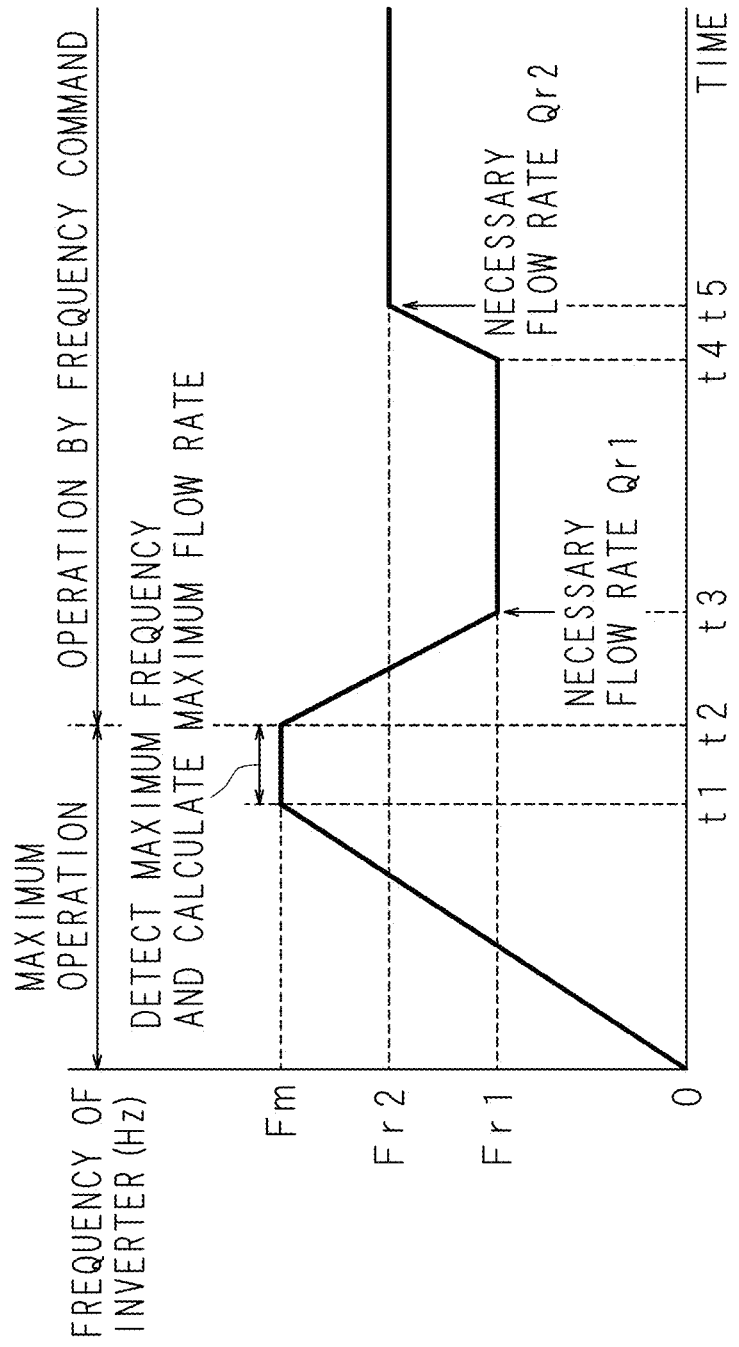
FIG. 7 is a time chart illustrating an example of operation of a medium supply apparatus according to the present embodiment.

Next, operation of the medium supply apparatus 100 according to the present embodiment is described below. FIG. 7 is a time chart illustrating an example of operation of the medium supply apparatus 100 according to the present embodiment. In FIG. 7, the horizontal axis indicates time and the vertical axis indicates the frequency obtained by conversion in the inverter 10. As illustrated in FIG. 7, at time 0, the user turns ON an operation switch (not illustrated) so as to start the operation of the motor 31 (start up the motor 31) into the maximum operation.

Then, at time t1, it is premised that the motor 31 has reached the maximum operating condition. The control part 20 detects the maximum frequency Fm from time t1 to time t2 and then calculates (identifies) the maximum flow rate Qm corresponding to the maximum frequency Fm. Further, during a period from time t1 to time t2 (e.g., approximately 5 seconds), the control part 20 determines whether a fluctuation in the frequency of the inverter 10 is, for example, Fm±1 Hz. Then, when the fluctuation is 1 Hz or smaller, a stable state is concluded so that the mode is changed from "maximum operation" to "operation by frequency command".

When it is premised that the user sets up a flow rate Qr1 as the necessary flow rate and that the operating frequency for achieving the flow rate Qr1 is Fr1, the control part 20 at time t2 performs control such that the frequency obtained by conversion in the inverter 10 is changed from Fm to Fr1. Then, at time t3, when the operating frequency reaches Fr1, the control part 20 continues operation with maintaining the operating frequency at Fr1. By virtue of this, the medium at the flow rate Qr1 is allowed to be supplied to the mold tool 1.

At time t4, when it is premised that the user changes the setting of the flow rate into Qr2, the control part 20 performs control such that the frequency obtained by conversion in the inverter 10 is changed from Fr1 to Fr2 corresponding to the flow rate Qr2. Then, at time t5, when the operating frequency reaches Fr2, the control part 20 continues operation with maintaining the operating frequency at Fr2. By virtue of this, the medium at the flow rate Qr2 is allowed to be supplied to the mold tool 1. From now on, similar operation is performed.

Further, as illustrated in FIG. 7, operation at the maximum is performed at each time of startup so that the maximum flow rate Qm in the present pressure-loss situation is allowed to be acquired. Thus, even when the mold tool 1 is changed so that the pressure loss varies, the medium at the necessary flow rate is allowed to be supplied to the mold tool 1. Further, even when operation is performed at a value smaller than the maximum (e.g., 70%, 80%, or 90% of the maximum), the medium at the necessary flow rate to is similarly allowed to be supplied to the mold tool 1.

For example, the display part 27 includes a display screen such as a liquid crystal panel, a speaker, and an indication lamp and hence has the function of a reporting part. When the torque or a physical quantity relevant to the torque detected by the detection part 21 is greater than the maximum (e.g., the maximum rating value, an allowable value in continuous operation, and an allowable value in short-time operation), the display part 27 reports the situation by using an image, sound, or light. By virtue of this, a situation is avoided that the motor 31 is driven in a condition of exceeding the maximum. Here, in a case that operation is performed at a given value (e.g., 70% of the maximum), when the torque or the physical quantity relevant to the torque detected by the detection part 21 becomes larger than a given value, the situation may be reported by using an image, sound, or light.

The display part 27 has the function of a notification part and, on the basis of the frequency Fm detected by the detection part 21 and the information stored in the storage part 25, notifies the amount of medium flowing through the pipe 5 (the passage). That is, in the information indicating the relation between the frequency and the medium amount stored in the storage part 25, a flow rate corresponding to the detected frequency Fm is identified and then the identified flow rate is notified as the amount of medium flowing through the pipe 5. By virtue of this, even when the pressure loss of the mold tool used actually is unknown, the flow rate of the medium in a case that the motor 31 is operated in a given condition is allowed to be recognized.

Figure 8:
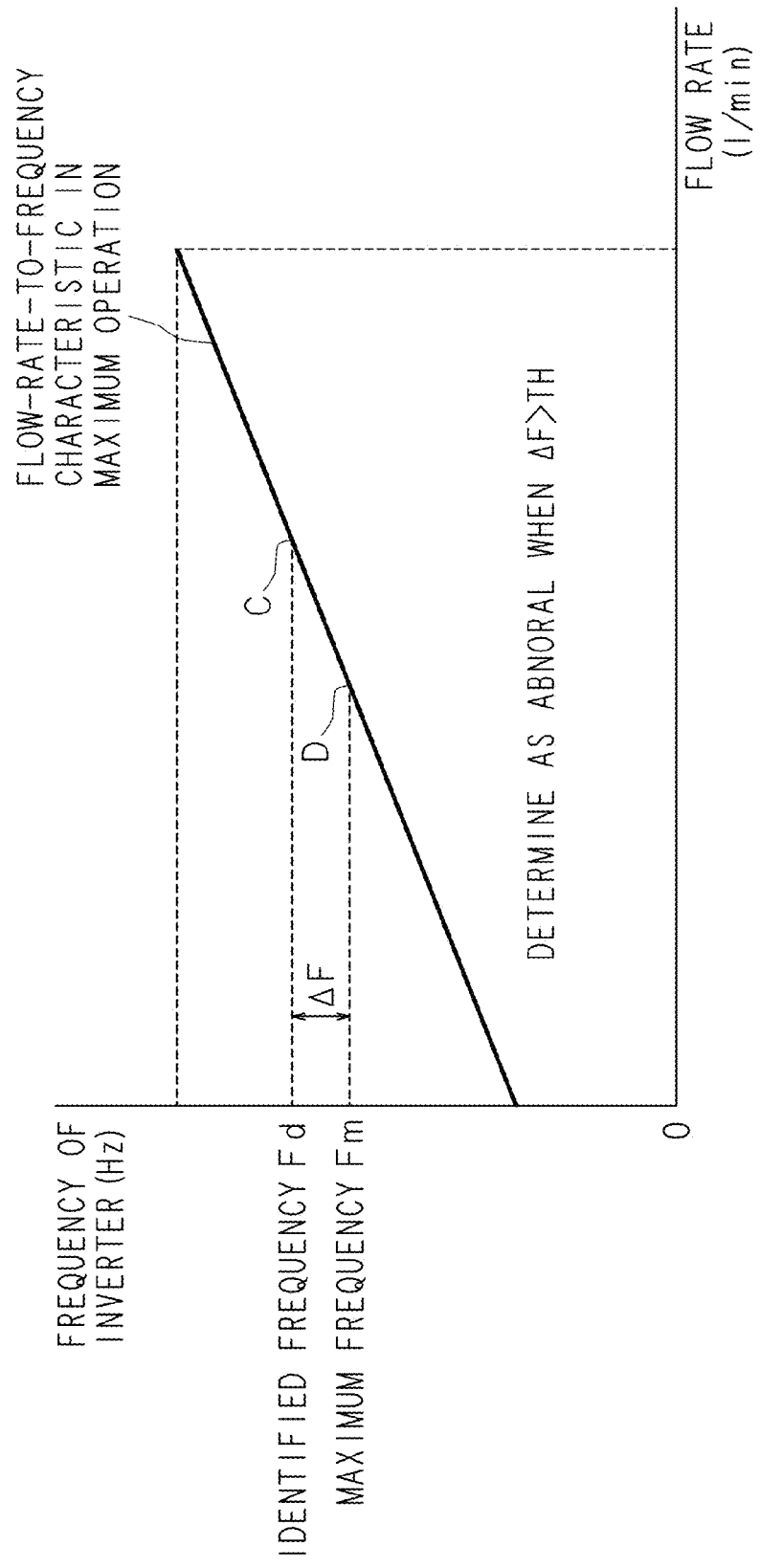
FIG. 8 is an explanation diagram illustrating an example of a method of determining the presence or absence of an abnormality in a pipe system performed by a medium supply apparatus according to the present embodiment.

FIG. 8 is an explanation diagram illustrating an example of a method of determining the presence or absence of an abnormality in the pipe system performed in the medium supply apparatus 100 according to the present embodiment. For example, in the example of FIG. 1, the pipe system includes the pump 30, the pipe 5, the medium sending valve 3, the medium returning valve 4, the tank 2, and the mold tool 1. In FIG. 8, the horizontal axis indicates the flow rate of the medium and the vertical axis indicates the frequency obtained by conversion in the inverter 10. Further, the straight line in FIG. 8 indicates the flow-rate-to-frequency characteristic in the maximum operation and is the same as that illustrated in FIG. 5.

The control part 20 has the function of an identification part and, from the information stored in the storage part 25, identifies a frequency (also referred to as an identified frequency) corresponding to a particular pipe resistance. For example, in a case that the mold tool 1 is connected through the pipe 5 to the medium supply apparatus 100, the particular pipe resistance indicates a pipe resistance including that of the mold tool 1. That is, when the necessary mold tool 1 is to be used, the frequency (also referred to as an identified frequency Fd) of the inverter 10 corresponding to the pipe resistance determined in correspondence to the mold tool 1 is identified in advance. In FIG. 8, the identified frequency Fd is a frequency corresponding to the point indicated by symbol C and is allowed to be identified in advance.

Then, in a situation that the motor 31 is actually operated with using the mold tool 1, when the difference ΔF between the frequency Fm (the frequency corresponding to the point indicated by symbol D in FIG. 8) detected by the detection part 21 and the frequency Fd stored in the storage part 25 is greater than a given threshold TH, the determination part 24 determines as abnormal. That is, in a situation that the motor 31 is actually operated with using the mold tool 1, the pipe resistance is equivalent to the above-mentioned particular pipe resistance. Thus, in the case of absence of an abnormality in the pipe system, the frequency detected by the detection part 21 becomes substantially equal to the identified frequency Fd. Accordingly, when the difference ΔF is greater than the threshold TH, the occurrence of an abnormality such as clogging in the pipe 5, leakage from the pipe, a failure in the opening and closing of a valve inserted into the pipe 5, and an abnormality in the pump 31 is allowed to be concluded so that rapid fixing is achievable.

The above-mentioned embodiment has been given for an example that the mold-tool temperature regulation apparatus employs liquid as the medium. However, the medium supplied by the medium supply apparatus is not limited to liquid. For example, the present embodiment may be applied also to a case that pneumatic transportation of powder is performed through a material supply pipe. In this case, when a necessary air flow rate is set up, the motor 31 is allowed to be operated in a condition suitable for ensuring the set-up air flow rate. Thus, air at the necessary air flow rate is allowed to be supplied.

Further, the storage part 25 has the function of storing a torque or a physical quantity relevant to the torque corresponding to a particular pipe resistance. From the information stored in the storage part 25, the control part 20 may identify a torque or a physical quantity relevant to the torque corresponding to the particular pipe resistance. Then, when the difference between the torque or the physical quantity relevant to the torque detected by the detection part 21 and the torque or the physical quantity relevant to the torque identified by the control part 20 is greater than a given threshold, the determination part 24 may determine as abnormal.

When the difference in the torque or the physical quantity relevant to the torque is greater than the threshold, the occurrence of an abnormality such as clogging in the pipe, leakage from the pipe, a failure in the opening and closing of a valve inserted into the pipe, and an abnormality in the medium drive part is allowed to be concluded so that rapid fixing is achievable.

The above-mentioned embodiment has been given for a configuration that when a necessary flow rate is set up, the frequency to be obtained by conversion in the inverter is controlled such that the motor is operated in a condition suitable for ensuring a necessary flow rate in accordance with the pipe resistance of the pipes (and passages) including the pipe between the medium drive part (e.g., a pump) and the mold tool and the passage in the mold tool. However, employable configurations are not limited to this. That is, in place of the necessary flow rate, a necessary pressure may be set up. Then, the frequency to be obtained by conversion in the inverter may be controlled such that the motor is operated in a condition suitable for ensuring the set-up pressure. That is, since the pressure in the pipe (the passage) is proportional to the torque of the motor and the flow rate is proportional to the inverter frequency, the relation between the torque and the frequency according to the present embodiment may be employed in alternative identification.

For example, a necessary pressure is set up and then the inverter frequency is controlled such that the electric motor is operated at a torque value corresponding to the set-up pressure. When the inverter frequency is identified, the flow rate of the medium is determined in correspondence to the identified inverter frequency (the identified frequency). Further, a pressure corresponding to the torque value of the electric motor is allowed to be obtained and then the pressure is allowed to be displayed.

Further, when the frequency varies in association with a change in the pressure, a difference arises between the detected frequency and the identified frequency. Thus, when the difference is greater than a given threshold, it is allowed to be determined that an abnormality of any kind has occurred in the inside of the pipe and caused a change in the pressure. In this case, the situation is allowed to be reported.

In place of the flow rate, a pressure is set up and then a change in the set-up pressure relative to the necessary pressure is detected. For example, in a case that a plurality of mold tools (e.g., mold tools having a high, a medium, and a low pipe resistance) are connected, when a flow rate is set up, the flow rate of the medium flowing through each mold tool is not allowed to be set up separately. Thus, the flow rate of the medium flowing through the mold tool having the highest pipe resistance is not known. However, in a case that the pressure is set up, even when the plurality of mold tools are connected, the pressure to each mold tool is allowed to be an appropriate value. Further, the user who administers the pressure to each mold tool is not required to change the point of administration and hence the past data or experience is allowed to be utilized. Thus, convenience to the user is maintained.

Here, at least a part of the above-mentioned embodiment may arbitrarily be combined with another part. As this description may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A medium supply apparatus provided with an inverter converting a frequency obtained from an AC power supply and with a medium drive part equipped with an electric motor driven by the inverter, so that a medium is supplied through a pipe by the medium drive part, the medium supply apparatus comprising:

a storage part storing, in advance, information indicating a relation between a change in the amount of medium supplied by the medium drive part and a change in a frequency obtained by conversion in the inverter in accordance with a pipe resistance in a state that the electric motor is operated in a given condition;

a frequency detection part detecting the frequency of the inverter in a case that the electric motor is operated in the given condition;

a medium amount calculation part, on the basis of the frequency detected by the frequency detection part and the information stored in the storage part, calculating the amount of medium to be supplied by the medium drive part;

a setup part setting up a necessary amount for the medium; and a frequency control part, on the basis of the necessary amount of medium set up by the setup part, the frequency detected by the frequency detection part, and the amount of medium calculated by said the medium amount calculation part, controlling the frequency to be obtained by conversion in the inverter.

2. The medium supply apparatus according to claim 1, wherein the given condition is that a torque of the electric motor in a constant torque region has an arbitrary given value.

3. The medium supply apparatus according to claim 1, wherein the given condition is that an output of the electric motor in a constant output region has an arbitrary given value.

4. The medium supply apparatus according to claim 2, wherein the given value is a maximum of the electric motor.

5. The medium supply apparatus according to claim 3, wherein the given value is a maximum of the electric motor.

6. The medium supply apparatus according to claim 1, comprising:

a detection part detecting the torque or a physical quantity relevant to the torque of the electric motor; and a reporting part, when the torque or the physical quantity relevant to the torque detected by the detection part is greater than the maximum, reporting the situation.

7. The medium supply apparatus according to claim 1, comprising:

an identification part, from the information stored in the storage part, identifying a frequency corresponding to a particular pipe resistance; and a determination part, when a difference between the frequency detected by the frequency detection part and the frequency identified by the identification part is greater than a given threshold, determining as abnormal.

8. The medium supply apparatus according to claim 1, comprising a notification part, on the basis of the frequency detected by the frequency detection part and the information stored in the storage part, notifying the amount of medium flowing through the pipe.

9. The medium supply apparatus according to claim 1, comprising:

a detection part detecting the torque or a physical quantity relevant to the torque of the electric motor;

an identification part, from the information stored in the storage part, identifying a torque or a physical quantity relevant to the torque corresponding to a particular pipe resistance; and a determination part, when a difference between the torque or the physical quantity relevant to the torque detected by the detection part and the torque or the physical quantity relevant to the torque identified by the identification part is greater than a given threshold, determining as abnormal.

* * * * *